US009750089B2

(12) United States Patent
Wiedemann et al.

(10) Patent No.: US 9,750,089 B2
(45) Date of Patent: Aug. 29, 2017

(54) COOKING DEVICE WITH A PREDETERMINED PARAMETER, PROGRAM AND/OR MODE OF OPERATION

(75) Inventors: Peter Wiedemann, Klosterlechfeld (DE); Andrea Jürgens, Kirchheim (DE); Cornelia Dietmayer, Weil (DE); Michael Greiner, Landsberg (DE); Erwin Schuller, Wolfratshausen (DE); Gerd Funk, Landsberg (DE); Thomas Treu, München (DE)

(73) Assignee: Rational AG, Landsberg/Lech (DE)

( * ) Notice: Subject to any disclaimer, the term of this patent is extended or adjusted under 35 U.S.C. 154(b) by 2214 days.

(21) Appl. No.: 10/585,285

(22) PCT Filed: Dec. 27, 2004

(86) PCT No.: PCT/DE2004/002820
§ 371 (c)(1),
(2), (4) Date: Jul. 10, 2007

(87) PCT Pub. No.: WO2005/066547
PCT Pub. Date: Jul. 21, 2005

(65) Prior Publication Data

US 2008/0295702 A1 Dec. 4, 2008

(30) Foreign Application Priority Data

Jan. 7, 2004 (DE) ........................ 10 2004 001 190
Mar. 19, 2004 (DE) ........................ 10 2004 013 553

(51) Int. Cl.
*A47J 27/00* (2006.01)
*H05B 6/64* (2006.01)

(52) U.S. Cl.
CPC .................................. *H05B 6/6435* (2013.01)

(58) Field of Classification Search
USPC .......................... 8/158, 159; 68/12.12, 12.27
See application file for complete search history.

(56) References Cited

U.S. PATENT DOCUMENTS 5,495,095 A 2/1996 de Matteis
5,997,928 A * 12/1999 Kaish et al. ................. 426/418
(Continued)

FOREIGN PATENT DOCUMENTS

DE 31 33 176 C1 10/1982
DE 296 05 567 U1 5/1996
(Continued)

OTHER PUBLICATIONS

International Search Report for PCT/DE2004/002820, mailed Aug. 8, 2005.
(Continued)

*Primary Examiner* — Thien S Tran
(74) *Attorney, Agent, or Firm* — Seed IP Law Group LLP

(57) ABSTRACT

A cooking device has at least one pre-set parameter for at least one predetermined program, such as a cooking program, and/or cleaning program, and/or for at least one predetermined mode of operation, such as a cooking mode of operation or a cleaning mode of operation. The preset parameter can be modified by means of at least one modification function element of a control element of the cooking device. During a particular time period, the modification can be confirmed, accepted and/or stored by means of at least one confirmation and/or storage function element of the control element of the cooking device, and after a particular time period has elapsed, the modification can be confirmed, accepted and/or stored automatically by the cooking device.

20 Claims, 4 Drawing Sheets

(56) References Cited

U.S. PATENT DOCUMENTS

| | | | | |
|---|---|---|---|---|
| 6,193,422 | B1 * | 2/2001 | Belt et al. | 713/320 |
| 6,255,630 | B1 | 7/2001 | Barnes et al. | |
| 6,671,916 | B2 | 1/2004 | Herr | |
| 7,356,459 | B2 | 4/2008 | Bergemann et al. | |
| 2003/0188323 | A1 | 10/2003 | Wittlinger | 725/153 |
| 2003/0212684 | A1 * | 11/2003 | Meyer et al. | 707/10 |
| 2004/0135701 | A1 * | 7/2004 | Yasuda et al. | 340/825.22 |
| 2004/0226708 | A1 | 11/2004 | Gutbrod et al. | 165/202 |

FOREIGN PATENT DOCUMENTS

| | | | | |
|---|---|---|---|---|
| DE | 198 32 757 | A1 | 6/1999 | |
| DE | 19832757 | * | 6/1999 | F24C 7/08 |
| DE | 19832757 | A1 | 6/1999 | |
| DE | 198 02 594 | A1 | 7/1999 | |
| DE | 19802594 | A1 * | 7/1999 | B60K 26/00 |
| DE | 19830844 | A1 * | 1/2000 | G05B 19/04 |
| DE | 101 17 292 | A1 | 10/2002 | |
| DE | 198 32 757 | C2 | 10/2002 | |
| DE | 101 33 135 | A1 | 1/2003 | |
| DE | 101 48 897 | A1 | 6/2003 | |
| DE | 101 55 410 | C1 | 9/2003 | |
| EP | 0 971 173 | A1 | 1/2000 | |
| EP | 1 174 538 | A2 | 1/2002 | |
| EP | 1 349 047 | A2 | 10/2003 | |

OTHER PUBLICATIONS

Written Opinion of the International Search Authority forwarded with the International Search Report for PCT/DE2004/002820, on Aug. 8, 2005.

Examination Report for DE 10 2004 013 553.3 A1, mailed Mar. 29, 2004.

Opposition against German Patent DE 10 2004 013 553 B4, filed on behalf of Convotherm Elektrogeraete GmbH, dated Jan. 30, 2007, 6 pages.

Decision of the German Patent and Trademark Office dated Dec. 11, 2008, regarding the Opposition filed on behalf of Convotherm Elektrogeraete GmbH against German Patent 10 2004 013553 B4, 6 pages.

Opposition against European Patent EP 1 706 673 B1, filed on behalf of Convotherm Elektrogeraete GmbH, dated May 15, 2008, 8 pages.

The Frymaster Corporation, "Service Manual, Frymaster H14 Series Electric Fryer", Mar. 2000, 110 pages.

BSH Home Appliances Corporation, "Bosch Use & Care Manual for Single and Double Built-in Ovens—Models HBL 73 . . . /74 . . . /75 . . . /76 . . . and HBN 74 . . . /75 . . . /76 . . . ", 2002, 44 pages.

Statement of Appeal, T0093/12-3.2.03, EP 1706673, dated Mar. 13, 2012, 15 pages.

* cited by examiner

COOKING DEVICE WITH A PREDETERMINED PARAMETER, PROGRAM AND/OR MODE OF OPERATION

RELATED APPLICATIONS

This is the U.S. national phase of International Application No. PCT/DE2004/002820 having an international filing date of Dec. 27, 2004 and claiming priority to DE 10 2004 001 190.7, filed Jan. 7, 2004, and DE 10 2004 013 553.3, filed Mar. 19, 2004.

FIELD OF THE DISCLOSURE

The present disclosure concerns a cooking device in which at least one parameter is preset for at least one predetermined program and/or for at least one predetermined mode of operation.

Cooking devices are known from the state of the art, which are already provided with predetermined programs or modes of operation by the manufacturer. Within these programs or modes of operation the parameters are also preset correspondingly. A program for a cooking device will be used as the term under which various modes of operation can be assigned which run in succession.

Preset modes of operation or cooking programs have cooking parameters which are usually set in the middle of the possible setting range. Preset modes of operation or cooking programs make it possible for the user to use a cooking device in a simple and efficient manner since such cooking devices represent an enormous facilitation of operation and savings in time.

However, a disadvantage of the known cooking devices is that, as stated above, the presettings are very general and as a rule lie in a standard range. Individual setting of the cooking parameters in order to run very special cooking processes or when cooking particular cooking products is possible only to a very limited degree or not at all with the known cooking devices. This limits the usefulness of such cooking devices with predetermined modes of operation or cooking programs considerably.

GENERAL DESCRIPTION

One task of the present disclosure is to provide a cooking device which overcomes the disadvantages of the state of the art and provides especially high flexibility and many different types of use while at the same time maintaining easy operation.

This task is solved by a cooking device in which at least one parameter is preset for at least one predetermined program, such as in the form of a cooking program and/or cleaning program and/or for at least one predetermined mode of operation, such as in the form of a cooking mode of operation or cleaning mode of operation, and the preset parameter can be modified using at least one modification function element of a control element of the cooking device, and the modification can be confirmed, accepted and/or stored during a predetermined time period and automatically after this time period through at least one confirmation- and/or storage function element of the control element of the cooking device.

Hereby it can be provided that the predetermined time period is adjustable, preferably through the control element, and especially about 1 to about 30 seconds after the last activation of the control element.

It is preferred according to one disclosed embodiment that the parameter be preset for a specific country, for the particular location and/or specifically for a selectable operating language of the cooking device, whereby preferably all parameters are preset for at least one program and/or for at least one mode of operation for the particular location and/or the selectable language of operation.

It is also preferred when at least one modification can be performed within predetermined, unchangeable limits, whereby the limits are preferably preset specifically for the country, for the particular location and/or for the selectable language of operation.

Hereby it can be provided that the presetting is performed automatically as a function of a location, detected especially by a locating system, and/or as a function of a selected language of operation.

One embodiment of the disclosure can be provided in which the modification function element comprises at least one dial, at least one display and/or at least one touch screen, whereby the touch screen comprises at least one touch element, especially with at least one bar graph.

Hereby it can be provided that the parameter is modifiable by at least occasional stroking of the touch element, preferably along the bar graph, especially with a finger.

It is also proposed with the disclosure that the confirmation and/or storage function element comprise at least one push button, at least one display and/or at least one touch screen, whereby preferably the touch screen has at least one touch element.

Hereby it can be provided that the push button is arranged in the region of the dial, whereby preferably the push button is arranged centrally within the dial or is molded in one piece with the dial.

Practical examples of the disclosure are characterized by the fact that the modification function element, especially the dial and/or the confirmation- and/or storage element, especially the push button, can be recessed in the cooking device, especially in the control element, at least occasionally at least partially, using a recessing device.

Hereby it is preferred that the recessing device can be adjusted manually and/or automatically as a function of at least one program and/or at least one mode of operation.

Similarly, according to the disclosure it can be provided that the confirmation- and/or storage function element comprise at least one signal emitter which, upon confirmation and/or storage of at least one parameter, emits at least one signal tone and/or causes, at least in one region, a color change on the control element, especially on the display, preferably of the touch element.

Another preferred embodiment of the disclosure is characterized by a notepad function for storing at least one modified parameter of at least one modified program and/or of at least one modified mode of operation, preferably under an enterable, especially freely selectable name, symbol, sign and/or pictogram.

Hereby it is provided that the notepad function is provided by means of at least one touch element, especially including at least one pictogram on a touch screen of the control element of the cooking device.

Furthermore it can also be provided that, using the notepad function, one can change from a first parameter to be modified, from a first program to be modified and/or from a first mode of operation to be modified, to a second parameter to be modified to a second program to be modified, or to a second mode of operation to be modified, that is, the change of the parameters, programs and/or modes of operation can be carried out in a way that is changeable or finalized.

Finally, according to the disclosure, an embodiment is proposed which is characterized by a control and/or regulating unit in working connection with the modification function element, the confirmation- and/or storage function element, the locating system and/or the recessing device.

The disclosure is based on the surprising finding that preset parameters for predetermined programs and/or modes of operation can be modified in a simple manner and then confirmed and/or stored, in order to increase the flexibility and the possible applications of a cooking device, but without equally increasing the complexity of the operability. Hereby, in the framework of the present disclosure, the term "confirmation" is to be understood as accepting changed parameters only for the program that is presently performed or for the present mode of operation, while the concept "storage" means the changed parameters are entered into a memory which is then the basis for all future programs or modes of operation to be performed. Both the confirmation as well as the storage occurs either actively, namely by operating a control element, or automatically, namely after the elapse of a certain time period.

The term "bar graph" as it is used in the present disclosure, is to be understood as a bar of a touch screen which has a type of scaling on which a desired parameter value can be set by stroking with the finger of the user.

Control elements arranged inside one another or combined save space. Recessable control elements are not only aesthetic in appearance, but facilitate operation, especially when they only emerge from their recess in a program-controlled manner, namely only when they are to be activated or are activatable.

In the cooking devices according to the disclosure, it is especially advantageous to predetermine the parameters and/or limiting values of these specifically for a country, especially when these are automatically set at the location of installation, which further simplifies operation of the cooking device according to the disclosure.

It is also especially advantageous in the cooking devices according to the disclosure when the predetermined parameters and/or limiting values are selected specifically as a function of a selected operating language. Such a language-specific presetting makes the operation of the cooking device possible independently of the location of installation in which a language is spoken other than the one with which the cooking device is to be operated. The variation of the presetting of the parameters and/or of the limiting values with respect to the location and/or the language of operation increases the flexibility of the cooking device according to the disclosure. In case of a language-specific predetermination, the cooking device according to the disclosure can therefore be adjusted variably to each individual user, by the user entering his preferred operating language of operation for the cooking device. Thus, for example, it is possible that an English-speaking user of the cooking device according to the disclosure who would like to eat the steak completely well-done, can use the device without any problem, although it is set for France, where a steak, as a rule, is to be preferably cooked to "medium." For this purpose, the English-speaking user only needs to enter English as the operating language, so that the parameters preset for the predetermined program in the cooking device can be recalled for the English operating language. By using the modification function element of the cooking device according to the disclosure, the user can optimize the preset parameters according to his or her wishes.

In order to store modified parameters, programs and/or modes of operation according to the disclosure, preferably a notepad function is provided which especially preferably is provided as a touch element on a touch screen of the control element of the cooking device. With this notepad function, a structured storage can be performed at different operating menu levels. The operation of the notepad function can lead, for example, to a finalizing of the input process (that is, to the modification of the parameters or similar) or it may also lead to change to the next mode of operation.

BRIEF DESCRIPTION OF THE DRAWINGS

Other characteristics and advantages of the disclosure follow from the detailed description given below in which a practical example of the disclosure will be explained in detail with the aid of a schematic drawing. The following are shown.

DETAILED DESCRIPTION

Figure 1:
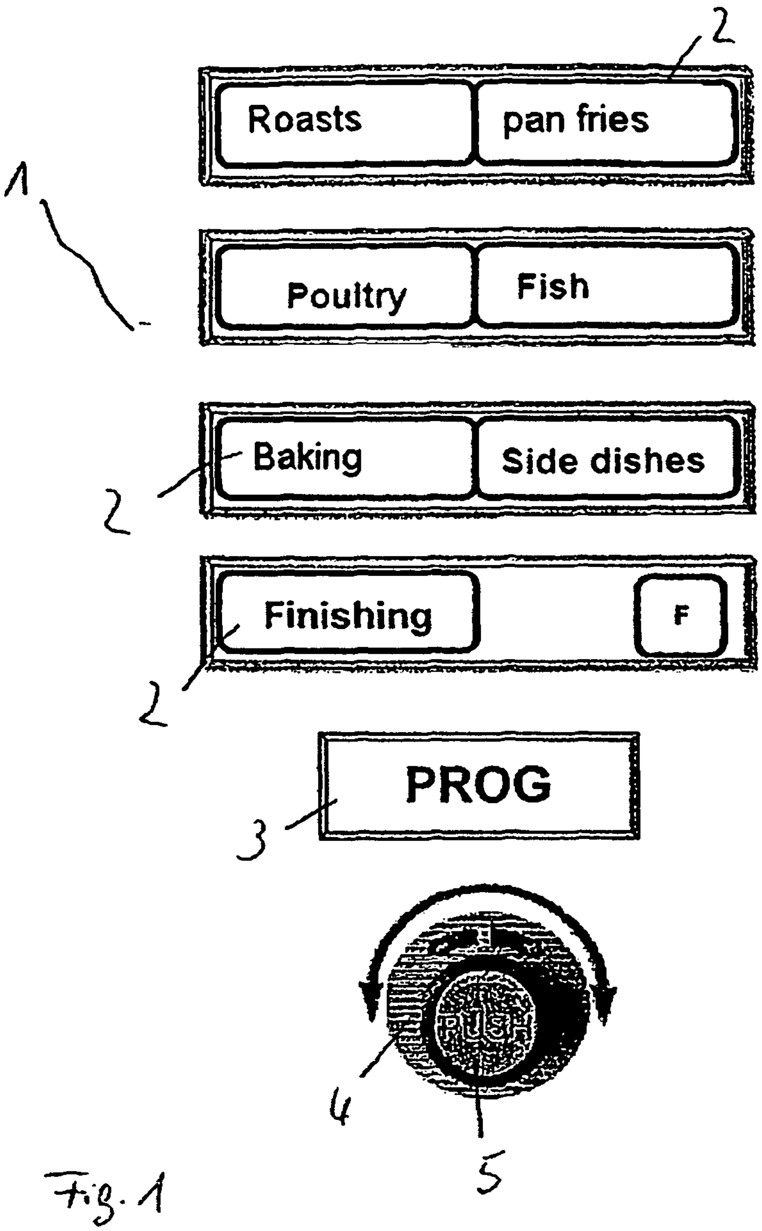
FIG. 1 is a section of a main menu level of a control element during operation of a cooking device according to the disclosure.

As can be seen from FIG. 1, a main menu level of a control element 1 for a cooking device according to the disclosure comprises a number of operating elements 2, which offer, for example, when the cooking device is turned on, a selection of cooking programs, for which the cooking device offers corresponding preset modes of operation as well as cooking parameters. According to FIG. 1, such cooking programs can comprise, for example, "roasts," "pan fries," "poultry," "fish," "baking," "side dishes" or "finishing." Preferably these cooking programs are presented in the form of pictograms on the operating elements 2. Especially, it is also preferred when the operating elements 2 are touch elements of a touch screen. The operating element 2 "F" represents a function key with which other functions of the cooking device can be selected, for example a programming lock, a start time input, a cleaning program, a lime removal program or similar, which do not involve any cooking.

Below the operating elements 2, in FIG. 1, besides a program key element 3, a dial 4 is provided which can be turned in the direction of the arrows as will be described below in order to change preset cooking parameters. The dial 4 also includes a push button 5 and by pressing this, for example, modified cooking parameters can be confirmed and/or stored.

Figure 2:
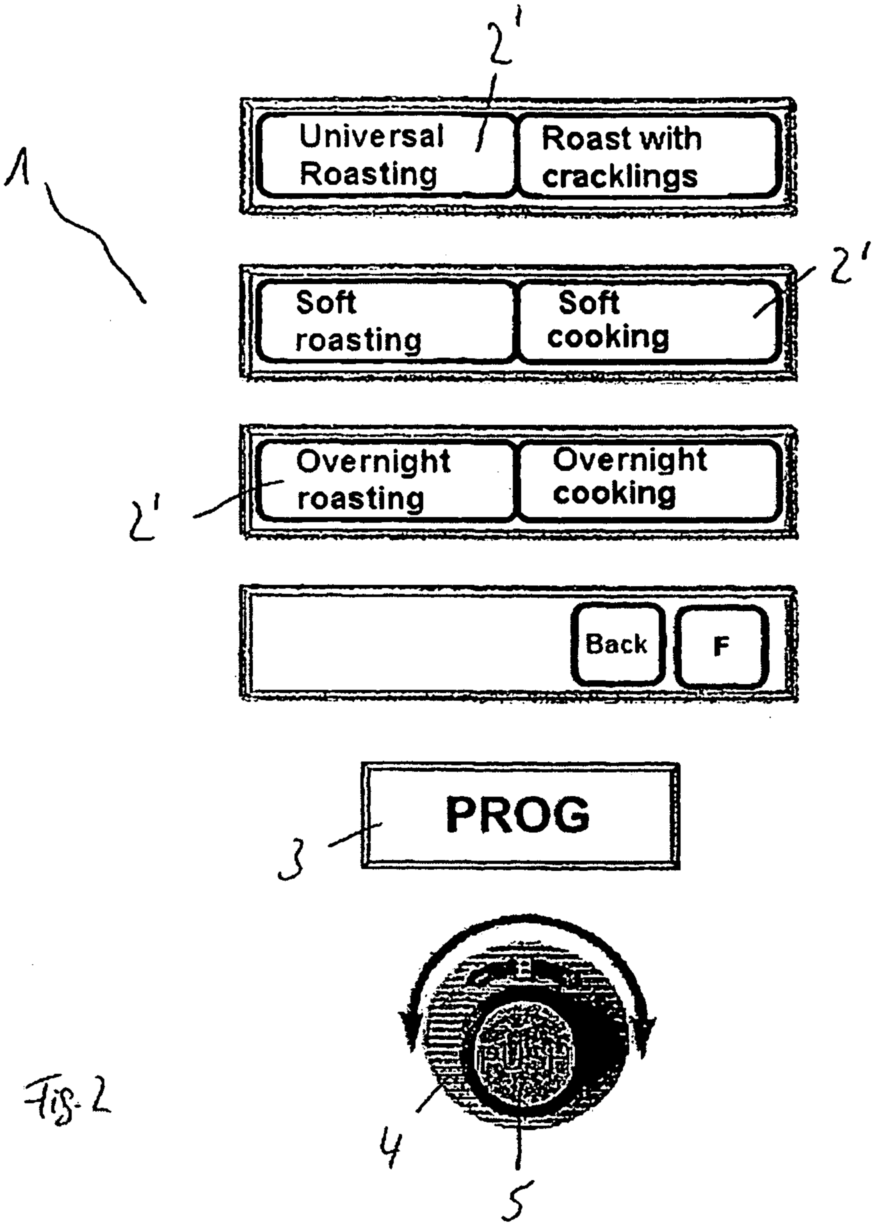
FIG. 2 is a section of a first sub-menu level which follows from the main menu level from FIG. 1.

Starting from the main operating level, which is shown in FIG. 1 as a section, one can arrive, for example, at the first sub-menu level which is shown in FIG. 2 in a section by activating the operating element 2 "roasts." This first sub-menu level again includes a number of operating elements 2', which offer the possible cooking programs under the cooking program "roasts." These are, for example, the cooking programs shown in FIG. 2 such as "universal roasting," "roast with cracklings," "soft roasting," "soft cooking," "overnight roasting," and "overnight cooking."

Figure 3:
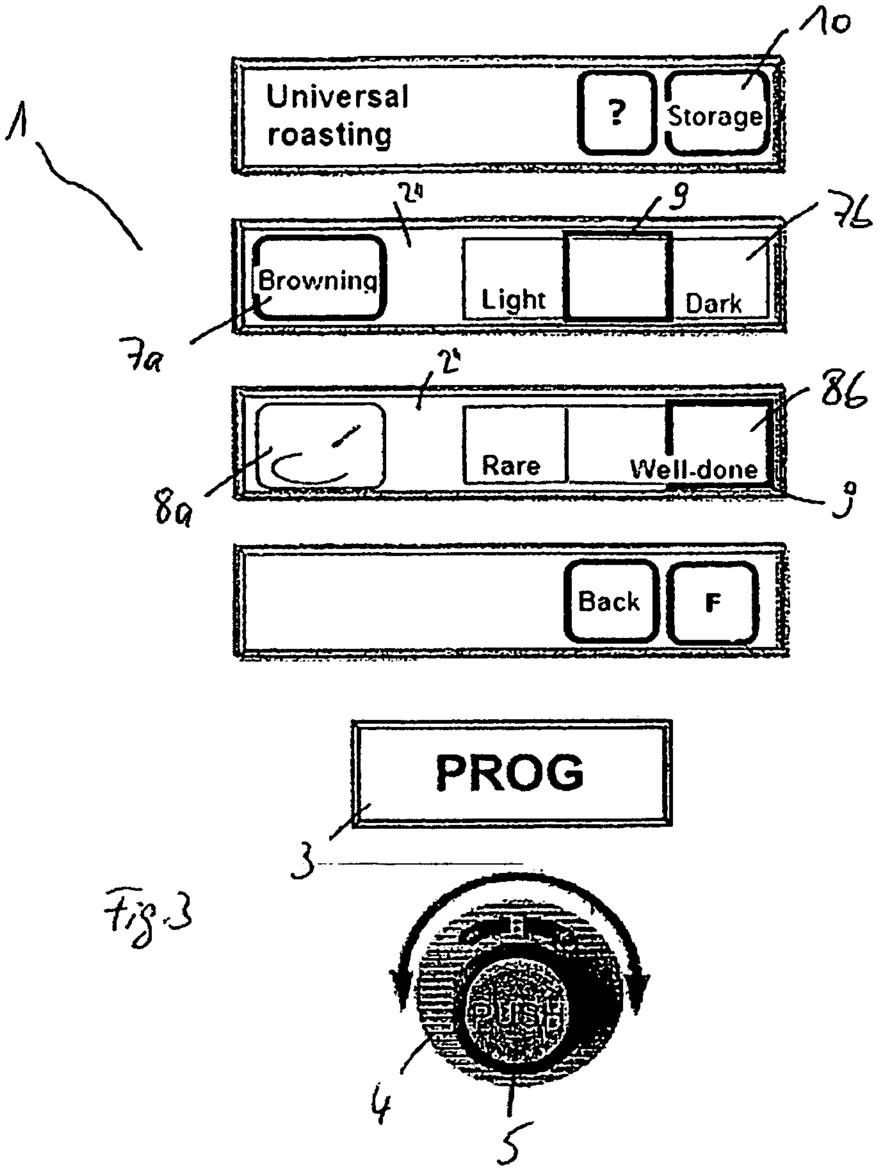
FIG. 3 is a section of a second sub-menu level which follows from the first sub-menu level from FIG. 2.

For example, by activating the operating element 2' "universal roasting", one arrives automatically at a second sub-menu level shown in FIG. 3. This second sub-menu level offers for the cooking program "universal roasting" the possibility to modify individual modes of operation or cooking parameters of the cooking process. As an example, in FIG. 3 the operating elements 2" are provided for setting the cooking parameters with regard to the browning of the roast and with regard to the core temperature of the roast. One can easily see that many other operating elements can be provided for other cooking parameters.

The operating elements 2" include a first touch element 7*a* or 8*a* and in each case a bar graph 7*b* or 8*b* as second touch element. For example, with the bar graph 7*b*, the desired browning of the roast can be set between the limiting values of "light" and "dark" by having the user stroke his or her finger over bar graph 7*b* and set the parameter correspondingly. The set value is shown in a frame 9. Similarly, the cooking parameter for the core temperature of the roast can be set through the other bar graph 8*b*, whereby for the limiting values "rare" and "well-done," corresponding core temperatures are established.

The set cooking parameters with regard to browning and core temperature of the roast can also be modified or fine adjusted as follows:

Let us say that, for example, on the second sub-operating level from FIG. 3, the cooking parameter needs to be altered with regard to browning of the roast. For this purpose, first the touch element 7*a* is operated, which activates the operating element 2" so that a change becomes possible at all. When the operating element 2" is activated, then the corresponding cooking parameter can be adjusted as desired either by appropriate turning of the dial 4 or by a stroking of the bar graph 7*b*. In the case shown in FIG. 4 the parameter is set in a middle position between "light" and "dark," which is shown by the Frame 9.

A confirmation or storage of the set cooking parameter with regard to browning can occur, for example, by pressing the push button 5. However, one can also imagine that the modified cooking parameter is accepted automatically by the cooking device after the elapse of a predetermined time duration after the last input or modification. A confirmation can also occur by subsequent pressing of touch element 7*a*.

Finally, in the second sub-operating level a memory element 10 is provided which makes it possible to store the modified cooking parameter via a notepad function as described before.

Preferably it is also provided that a confirmation or storage of the adjusted cooking parameters is related to an acoustic signal of the cooking device or to a color change in the control element of the cooking device.

Analogously, in order to change the core temperature, the touch element 8*a* can be operated and then the parameter can be modified via the bar graph 8*b* or the dial 4.

As can be seen from touch element 8*a*, the setting of the core temperature requires the setting of a temperature sensor into a roast. Preferably, it is provided that the cooking device sends a request or a signal when it recognizes that the temperature sensor is not inserted in the roast.

The setting of the cooking parameters with the aid of dial 4 or bar graph 7*b*, 8*b*, is preferably possible essentially continuously. As it will be understood by a person skilled in the art, for the cooking parameters shown in FIG. 4, suitable temperature values are established. Hereby the corresponding preadjustment can be specific for the country, that is, it can depend on the location. Thus, for example, in Germany the selection of "rare" is achieved by setting the core temperature to a desired core temperature of, for example, 65° C., while for the setting "well-done," a core temperature of 78° C. must be reached. In France, for example, these values can be set differently. The location of the cooking equipment can be detected automatically, for example with the aid of a locating system, so that a presetting of the parameters specifically for a country can occur automatically.

Figure 4:
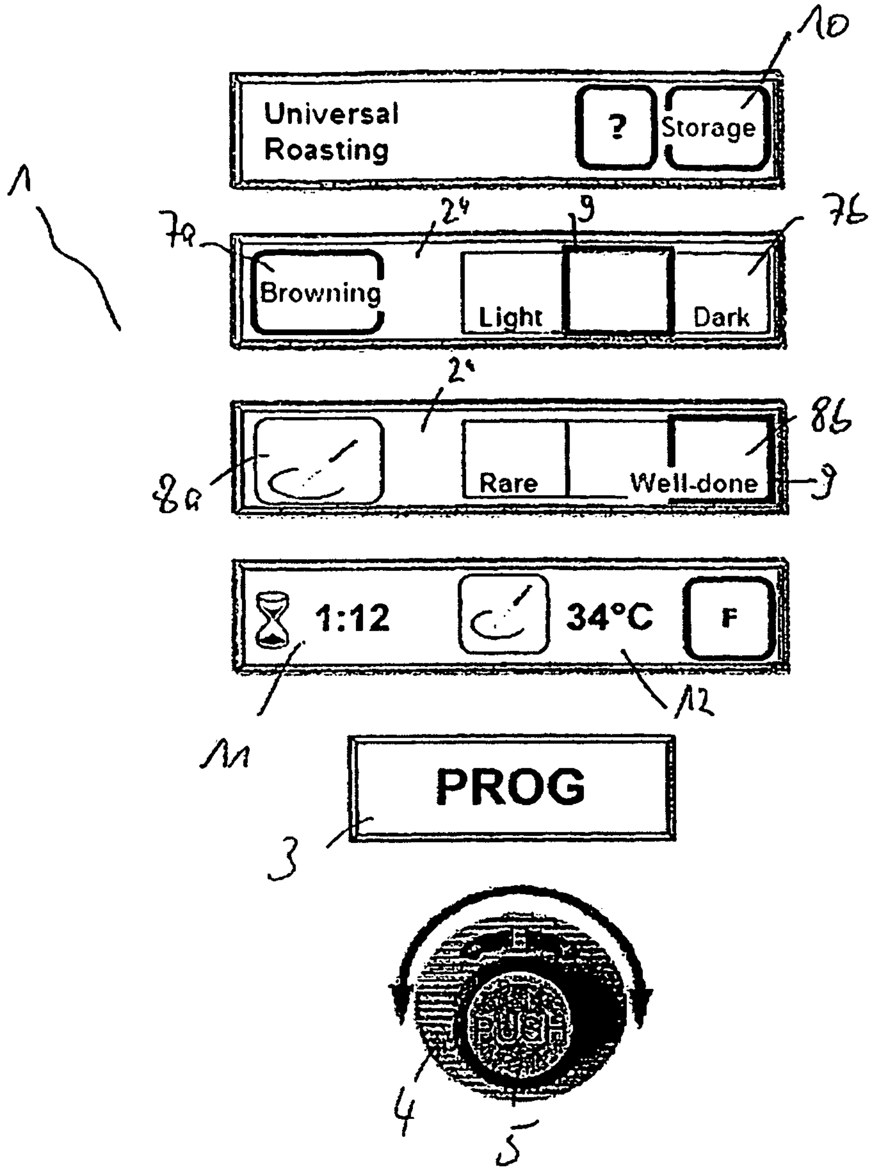
FIG. 4 is the second sub-menu level from FIG. 3 during operation of a cooking process in the cooking device according to the disclosure.

FIG. 4 shows the second sub-menu level during the operation of a cooking process. Hereby, in this sub-menu level further data can be shown such as, for example, a residual running time 11 of the cooking process or a presently-existing actual core temperature 12 of the roast.

The characteristics of the device in the previous description, in the drawings, as well as in the claims, can be essential individually as well as in any arbitrary combination for the realization of the disclosure in its different embodiments.

The invention claimed is:

1. A cooking device, comprising:

a locating system that automatically detects a geographic location of the cooking device;

a control or regulating unit that controls an environmental cooking condition inside the cooking device;

a control element communicatively connected to the locating system and to the control or regulating unit, wherein the control element comprises:

a modification function input device; and a confirmation or storage function input device, wherein the control or regulating unit implements a cooking program or cooking mode of operation using a cooking parameter that is automatically preset based on (1) the cooking program or cooking mode of operation and (2) the geographic location of the cooking device, wherein the value of the cooking parameter defines an environmental cooking condition inside the cooking device for the cooking program or cooking mode of operation, wherein the control element receives information from the locating system regarding the geographic location of the cooking device and automatically presets the cooking parameter by setting the value of the cooking parameter based on the geographic location of the cooking device and the cooking program or cooking mode of operation, wherein the modification function input device is operable by an operator of the cooking device to modify the preset cooking parameter, wherein the confirmation or storage function input device is operable by the operator of the cooking device to affirmatively confirm, accept, or store the preset or modified cooking parameter during a predetermined time period, and wherein the cooking device automatically confirms, accepts, or stores the preset or modified cooking parameter if the predetermined time period has elapsed and the operator has not operated the confirmation or storage function input device with regard to the preset or modified cooking parameter.

2. The cooking device according to claim 1, wherein the control element further adjusts the predetermined time period.

3. The cooking device according to claim 2, wherein the predetermined time period is approximately one second to approximately thirty seconds after the last activation of the control element.

4. The cooking device according to claim 1, further comprising predetermined unchangeable limits within which the modification function input device modifies the preset cooking parameter.

5. The cooking device according to claim 4, wherein the predetermined unchangeable limits are preset based on the geographic location of the cooking device.

6. The cooking device according to claim 1, wherein the cooking device includes a plurality of cooking parameters and the control element automatically presets all of the cooking parameters based on the geographic location of the cooking device and the cooking program or cooking mode of operation.

7. The cooking device according to claim 1, wherein the geographic location of the cooking device is a country-specific location.

8. The cooking device according to claim 1, wherein the confirmation or storage function input device is operable to automatically confirm, accept, or store the preset or modified cooking parameter after the predetermined time period lapses.

9. The cooking device according to claim 1, wherein the environmental cooking condition is at least one of temperature, humidity, and time of cooking.

10. The cooking device according to claim 1, wherein the modification function input device is at least one of a dial, display, and a touch screen.

11. A cooking device, comprising:

a locating system that automatically detects a geographic location of the cooking device;

an interface operable to select an operating language of the cooking device;

a control or regulating unit that controls an environmental cooking condition inside the cooking device;

a control element communicatively connected to the locating system, the interface, and the control or regulating unit, wherein the control element comprises:

a modification function input device; and a confirmation or storage function input device, wherein the control or regulating unit implements a cooking program or cooking mode of operation using a cooking parameter that is automatically preset based on (1) the cooking program or cooking mode of operation and (2) at least one of the geographic location of the cooking device and the selected operating language of the cooking device, wherein the value of the cooking parameter defines an environmental cooking condition inside the cooking device for the cooking program or cooking mode of operation;

wherein the control element receives information from at least one of the locating system and the interface and automatically presets the cooking parameter by setting the value of the cooking parameter based on the cooking program or cooking mode of operation and at least one of the geographic location of the cooking device and the selected operating language of the cooking device, wherein the modification function input device is operable by an operator of the cooking device to modify the preset cooking parameter, wherein the confirmation or storage function input device is operable by the operator of the cooking device to affirmatively confirm, accept, or store the preset or modified cooking parameter during a predetermined time period, and wherein the cooking device automatically confirms, accepts, or stores the preset or modified cooking parameter if the predetermined time period has elapsed and the operator has not operated the confirmation or storage function input device with regard to the preset or modified cooking parameter.

12. The cooking device according to claim 11, wherein the control element further adjusts the predetermined time period.

13. The cooking device according to claim 12, wherein the predetermined time period is approximately one second to approximately thirty seconds after the last activation of the control element.

14. The cooking device according to claim 11, further comprising predetermined unchangeable limits within which modification function input device modifies the cooking parameter.

15. The cooking device according to claim 14, wherein the predetermined unchangeable limits are preset based on the location of the cooking device and the selected operating language of the cooking device.

16. The cooking device according to claim 11, wherein the cooking device includes a plurality of cooking parameters and the control element automatically presets all of the cooking parameters based on the location of the cooking device, the selected operating language of the cooking device, and the cooking program or cooking mode of operation.

17. The cooking device according to claim 11, wherein the geographic location of the cooking device is a country-specific location.

18. The cooking device according to claim 11, wherein the confirmation or storage function input device is operable to automatically confirm, accept, or store the preset or modified cooking parameter after the predetermined time period lapses.

19. The cooking device according to claim 11, wherein the environmental cooking condition is at least one of temperature, humidity, and time of cooking.

20. The cooking device according to claim 11, wherein the modification function input device is at least one of a dial, display, and a touch screen.

* * * * *